June 3, 1958  E. L. LADD  2,837,360

SELF ENERGIZING SEALING RING

Filed Aug. 20. 1953

INVENTOR
Edward L. Ladd
BY
His ATTORNEY

United States Patent Office 2,837,360
Patented June 3, 1958

2,837,360

SELF ENERGIZING SEALING RING

Edward L. Ladd, Dayton, Ohio, assignor to United Aircraft Products, Inc., Dayton, Ohio, a corporation of Ohio Application August 20, 1953, Serial No. 375,351

2 Claims. (Cl. 288—24)

This invention relates to sealing rings, and particularly to hollow metallic sealing rings.

Hollow metal sealing rings have heretofore been known, but in only two forms. In the one instance the rings are pressure filled, with a gas. In the other instance the rings are unpressurized. In both instances the rings are sealed to preclude communication of the interiors of the rings with surrounding airs or gases.

The pressure filled ring has the disadvantage that relatively large torsional forces are required properly to assemble opposing structural members with a pressure filled sealing ring therebetween. These forces must be in excess of the internal pressure of the ring, whereas it is desirable that such internal pressures be relatively high to avoid crushing of the ring by the pressures under control.

The unpressurized sealing ring offers only slight resistance to crushing pressures and hence has a very limited utility.

The pressure filled ring has been found useful in heavy industries where ample forces are available to compress the ring and where the pressures under control are not large. The non-pressure filled ring has found some usefulness in lighter industry, and where the pressures under control are relatively small.

Between these extremes is a wide area in which the hollow metal sealing ring has not heretofore been successfully used, and it is the object of this invention to provide a ring applicable to that area, as well as to the useful areas of the pressure filled and non-pressure filled rings. Thus, the instant invention proposes a general purpose hollow metal sealing ring.

In carrying out the objects of the invention, a principle of self energization is employed. Thus a hollow metal sealing ring in accordance with the illustrated embodiment of the invention comprises a section of thin metal tubing joined together at its ends and having one or more small diameter openings for communicating the pressure value of the pressure under control to the interior of the ring. A sealing ring of this invention, therefore, is easily compressed in the initial assembly of the parts but effectively resists all crushing pressures since the pressures inside and outside the ring are always substantially the same. The best features of the pressure filled and non-pressure filled rings so are combined in the present self energized ring, resulting in a ring of broader application and larger useful life than either of the types of hollow metal sealing rings heretofore known.

Figure 1:
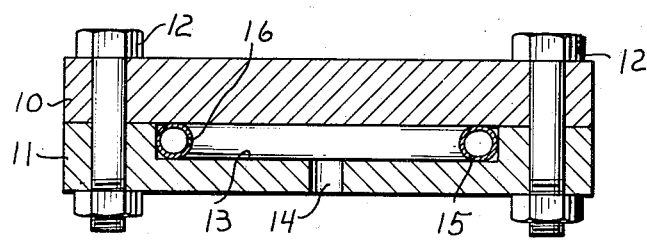
Figure 2:
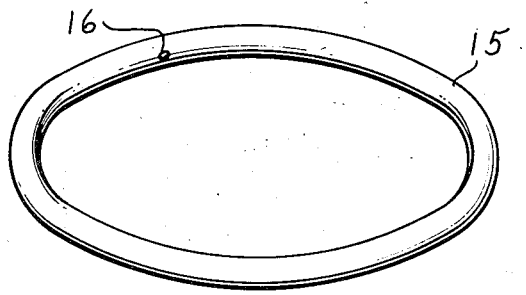

In the drawing, Fig. 1 is a view in cross section of a sealing ring in accordance with the instant invention, in a representative installation; and Fig. 2 is a view of the ring of Fig. 1, in perspective.

In the representative illustration of Fig. 1, a pair of structural plate members 10 and 11 are in face to face, contacting relation and are so held by bolts 12 interconnecting the plates at the side edges thereof. The plate 11 has a central recess 13, facing the plate 10 and communicating with the exterior of the assembly by way of an opening 14. It may be considered that fluid under pressure is admitted to the recess 13 through opening 14 and is further directed and controlled in a manner which it is unnecessary here to understand. So that pressure fluid in the recess 13 may be prevented from escaping radially outward between the plates 10 and 11 a sealing ring 15 is installed in the recess 13 in a position to make common contact with the bottom and side walls of the recess and with the opposing face of plate 10.

The ring 15 is metallic and hollow, and is formed with one or more perforations 16 which are relatively small and are located on the inner periphery to face the axis of the ring. While the ring 15 may assume various cross sectional shapes, and be variously constructed, it is in the present instance round and formed from tubing of a suitable metal, for example, copper. A section of tubing is bent to the desired shape and the opposing ends are then welded together in a manner to produce a unitary, sealed ring. The perforations 16 are formed in the tubing either prior to or after it is bent and welded to define the ring.

The sealing ring 15 is lightly compressed by the clamping together of the plates 10 and 11 and since this will ordinarily be done without pressure fluid in the recess 13, the ring offers no resistance other than the natural elasticity of the metal. As pressure fluid is admitted to the recess 13 it is effective over a large external area of the ring 15 and would ordinarily tend to crush the ring, destroying its sealing engagement with the plate 10. In the present instance, however, the interior of the ring 15 also is in communication with the pressure fluid source, by virtue of the openings 16. Hence the external pressure tending to crush the sealing ring is balanced by an equal and opposing internal pressure. Hence the sealing ring 15 retains its original shape against pressures of any value admitted to the recess 13, except to the extent that portions of the ring may be deformed by the internal pressure into tighter sealing contact with the sealing surfaces of the plates 10 and 11.

In this connection it will be noted that the controlled or working pressure is applied to the sealing ring on only one side thereof. On the opposite side of the ring the external pressure is low in relation to the internal pressure which thus tends to deform portions of the ring into a tighter, more extensive contact with the sealing surfaces. Further, it will be understood that the opening or openings 16 are located so as to be on the higher pressure side of the installations. In the example illustrated, if the chamber 13 were being exhausted, as with a vacuum pump, the openings 16 would be located on the opposite side of the ring.

What is claimed is, as a new article of manufacture:

1. A self energized sealing ring of a kind adapted to be received in a recess in a flat sealing surface for predetermined compression loading by a second superposed sealing surface, comprising a length of relatively thin tubing formed from metal of uniform thickness and having its ends joined together to define an O-shaped ring, said tubing having at least one opening of small diameter therein, said opening being positioned so as to face that side of the tubing which in the installation thereof is subjected to the higher external pressure, whereby the whole interior of the ring is energized in accordance with said higher external pressure and the ring responds to variation in deflection of the sealing surfaces with a natural resilience uninhibited by the external pressure.

2. A self energized sealing ring of a kind adapted to be received in a recess in a flat sealing surface for predetermined compression loading by a second superposed sealing surface, comprising a length of thin metal tubing having its ends joined together to define an O-shaped ring describing a hollow annular chamber, said chamber being of identical cross sectional dimension throughout its entire length, the metal of said tubing being of uniform thickness for substantially constant bowing of the ring under constant load, said tubing having at least one opening of small diameter therein, said opening being positioned so as to face that side of the tubing which in the installation thereof is subjected to the higher external pressure, whereby the whole of the annular chamber is energized and the ring responds to variation in deflection of the sealing surfaces with a natural resilience uninhibited by the external pressure.

References Cited in the file of this patent

UNITED STATES PATENTS

| | | |
|---|---|---|
| 685,610 | Huhn | Oct. 29, 1901 |
| 836,950 | Wilcox | Nov. 27, 1906 |
| 2,133,934 | Ericsson et al. | Oct. 18, 1938 |

FOREIGN PATENTS

| | | |
|---|---|---|
| 474,238 | Great Britain | Oct. 27, 1937 |
| 595,332 | France | July 13, 1925 |